United States Patent

Van Dine et al.

[11] Patent Number: 6,125,528
[45] Date of Patent: Oct. 3, 2000

[54] METHOD FOR MAKING A COMPOSITE ELECTRIC MOTOR HOUSING

[75] Inventors: Piet Van Dine, Stonington, Conn.; Vladimir Odessky, North Brunswick, N.J.; Brian E. Spencer, Lincoln, Nebr.; James S. Smith, Old Lyme; William R. Harring, Oakdale, both of Conn.

[73] Assignee: Electric Boat Corporation, Groton, Conn.

[21] Appl. No.: 09/055,662

[22] Filed: Apr. 6, 1998

Related U.S. Application Data

[62] Division of application No. 08/840,065, Apr. 24, 1997.

[51] Int. Cl.[7] .................................................. H02K 15/00
[52] U.S. Cl. .......................... 29/596; 29/598; 29/527.1; 29/527.2; 29/527.3; 29/527.4; 310/89
[58] Field of Search .................... 29/596, 598, 527.1, 29/527.2, 527.3, 527.4; 310/89

[56] References Cited

U.S. PATENT DOCUMENTS

| | | |
|---|---|---|
| 1,808,845 | 6/1931 | Gifford et al. . |
| 2,763,769 | 9/1956 | Happe . |
| 3,873,864 | 3/1975 | Apostoleris . |
| 4,048,530 | 9/1977 | Kaufman, Jr. . |
| 4,484,094 | 11/1984 | Ade et al. . |
| 4,614,886 | 9/1986 | Schneider et al. . |
| 4,631,433 | 12/1986 | Stokes . |
| 4,705,983 | 11/1987 | Franz et al. . |
| 4,729,160 | 3/1988 | Brown . |
| 4,823,032 | 4/1989 | Ward et al. . |
| 4,854,828 | 8/1989 | Haentjens ............................. 417/360 |
| 4,879,483 | 11/1989 | Barahia . |
| 4,918,324 | 4/1990 | Isozumi . |
| 5,003,210 | 3/1991 | Liu et al. ................................. 310/87 |
| 5,047,679 | 9/1991 | Baader et al. . |
| 5,072,145 | 12/1991 | Davis et al. . |
| 5,073,735 | 12/1991 | Takagi . |
| 5,126,608 | 6/1992 | Sogabe et al. . |
| 5,138,208 | 8/1992 | Kondo et al. . |

FOREIGN PATENT DOCUMENTS

| | | |
|---|---|---|
| 431826 | 8/1994 | Germany . |
| 9029753A | 2/1997 | Japan . |

OTHER PUBLICATIONS

Encyclopedia of Polymer Science and Technology, pp. 111–112, 18–19 of vol. 12, 1970.

*Primary Examiner*—P. W. Echols
*Assistant Examiner*—John C. Hong
*Attorney, Agent, or Firm*—BakerBotts, LLP

[57] ABSTRACT

An electric motor housing is made by press-forming a composite material on a metal cylinder and machining passages in the press-formed material. This reduces weight, reduces motor vibration transmission, increases mechanical damping, improves corrosion resistance and improves electrical performance.

5 Claims, 4 Drawing Sheets

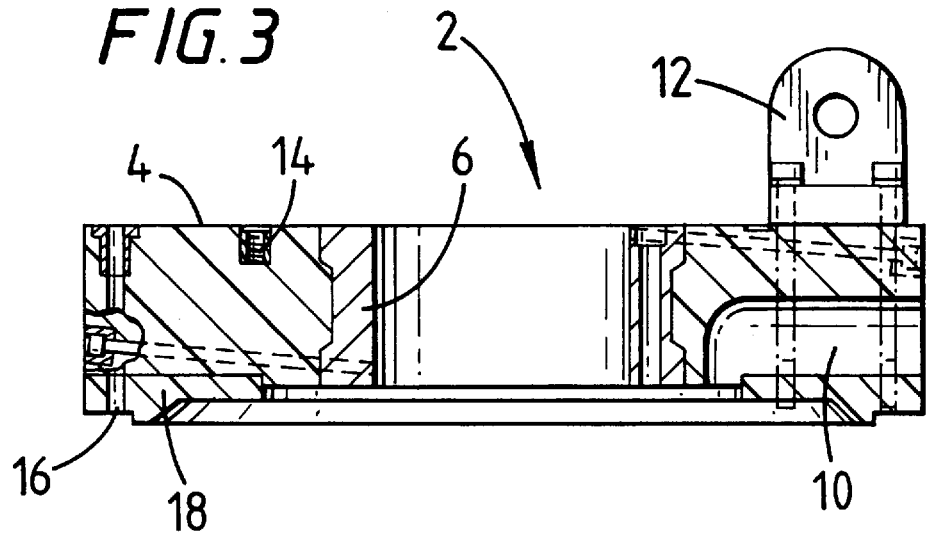
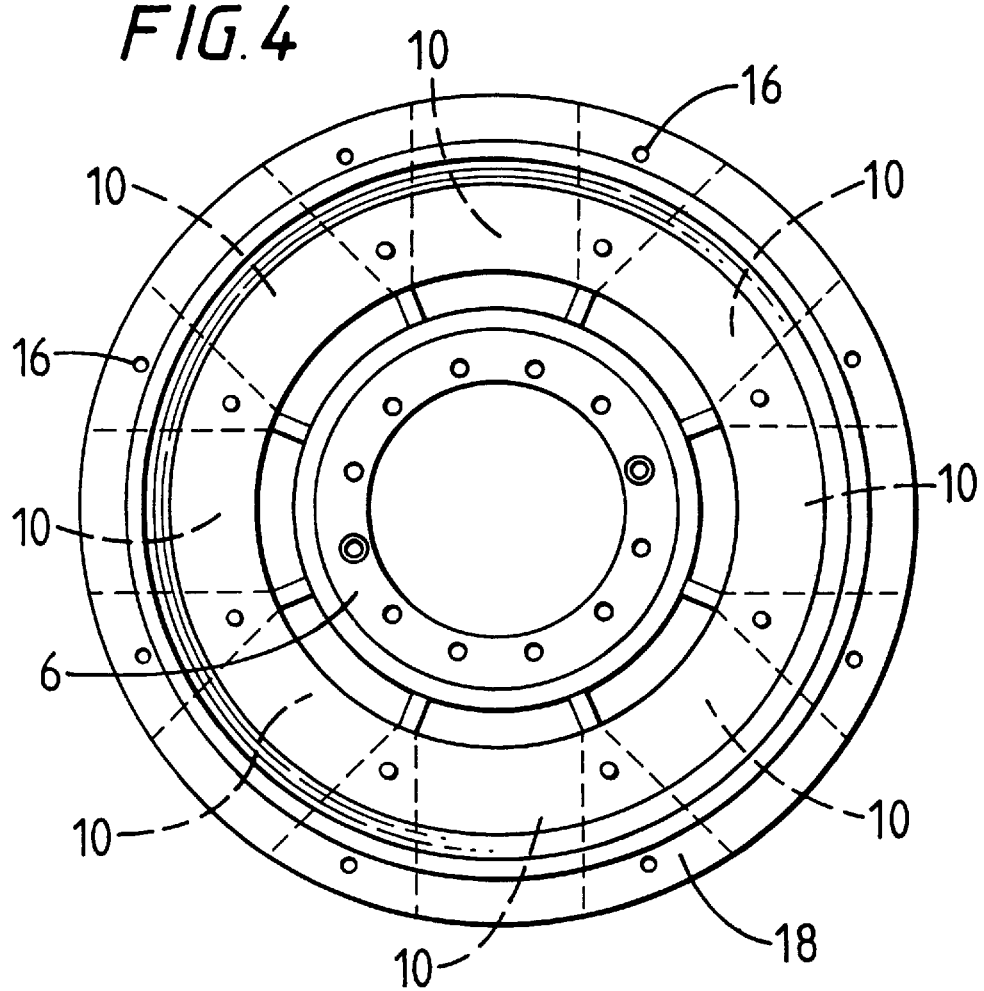

METHOD FOR MAKING A COMPOSITE ELECTRIC MOTOR HOUSING

REFERENCE TO RELATED APPLICATION

This application is a division of co-pending application Ser. No. 08/840,065, filed Apr. 24, 1997.

BACKGROUND OF THE INVENTION

This invention relates to housings for electric motors and, more particularly, a motor housing having reduced weight and vibration transmission and improved mechanical damping, improved corrosion resistance and improved motor performance.

Conventional housings for electric motors are typically formed from fabricated cast or forged metal. The metals used in the housings include steel or corrosion resistant alloys. The damping properties, weight and other characteristics of the housing are a function of the materials used to construct the housing as well as the geometry of motor construction.

SUMMARY OF THE INVENTION

Accordingly, it is an object of the invention to provide an electric motor housing which has reduced weight and reduced vibration transmission.

It is also an object of the invention to provide an electric motor housing which absorbs or dampens vibration.

It is a further object of the invention to provide an electric motor housing which provides improved corrosion resistance and improves motor performance.

These and other objects of the invention are obtained by providing an electric motor housing including a substantially cylindrical housing member formed from a nonmetallic material having an inner metal cylinder or hub.

BRIEF DESCRIPTION OF THE DRAWINGS

Further objects and advantages of the invention will be more fully appreciated from a reading of the detailed description when considered with the accompanying drawings wherein:

FIG. 3 is a cross sectional view of the front end part of the motor housing taken along line III—III of FIG. 1 and looking in the direction of the arrows;

FIG. 4 is a side view of the front end part of the motor housing showing the side opposite from that shown in FIG. 1;

FIG. 7 is an edge view of the front end part of the motor housing shown in FIGS. 5–6 and FIG. 8 is a sectional view of composite material laid around a metal cylinder and between two metal plates, respectively, in accordance with the invention.

DESCRIPTION OF THE PREFERRED EMBODIMENTS

Figure 1:
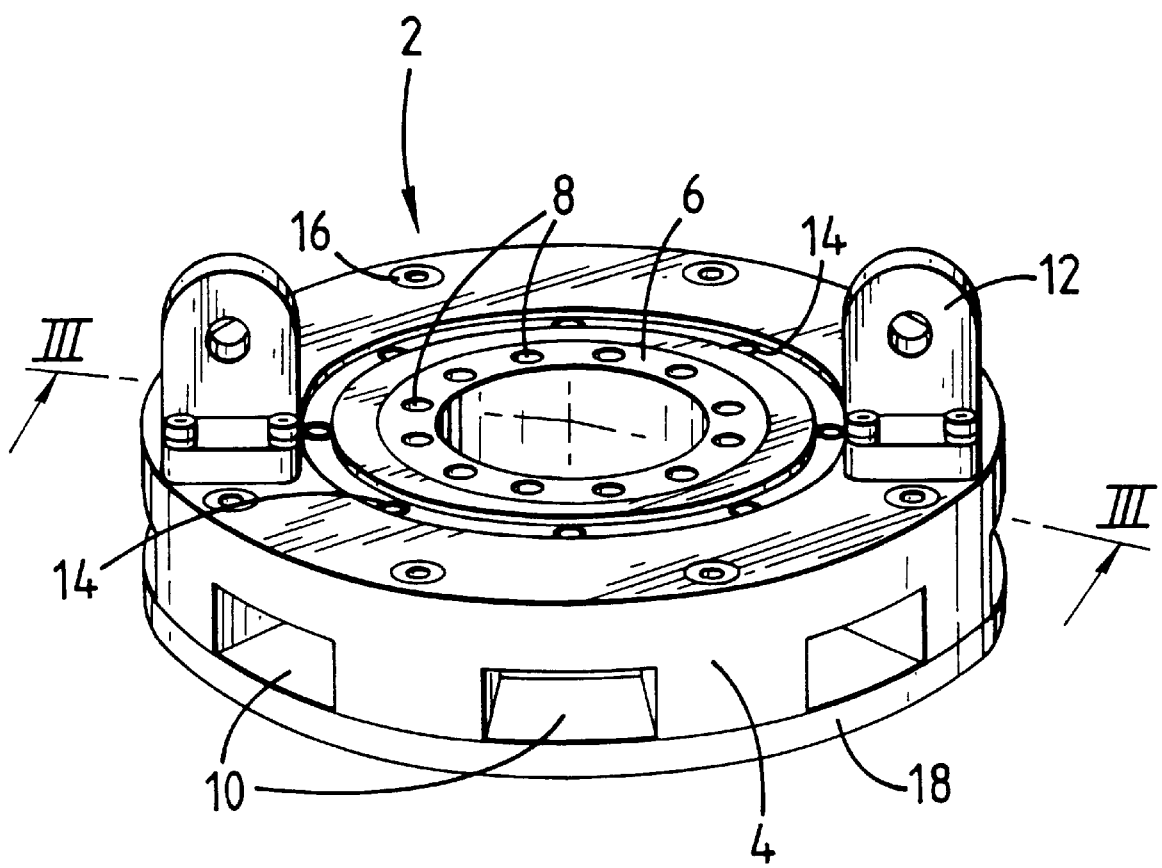
FIG. 1 is a perspective view of the front end of a representative embodiment of a composite motor housing in accordance with the invention.

As shown in the representative embodiment illustrated in the drawings, the front end part 2 of an electric motor housing according to the invention is substantially cylindrical in shape and has a wall 4 which is formed from a composite material. The end part 2 includes a main bearing support for the motor drive shaft consisting of a metal hub sleeve 6 embedded in the composite wall 4 and bolt holes for assembly of the end part 2 into the motor housing.

In order to provide air cooling of the motor, vents or apertures 10 are provided in the composite wall 4. In addition, metal lifting lugs 12 in the end part 2 provide attachment points for lifting and rigging of the electric motor and pump assembly. Threaded metal inserts 14 are provided in the end wall 2 for a cover guard (not shown). Through holes 16, contain metal sleeves embedded in the composite wall, to act as a bearing surface for hold down fasteners (not shown in FIG. 1) for connecting the front end part 2 to the stator frame housing. A metal bottom plate 18 aligns the front end housing to the stator frame housing.

Figure 2:
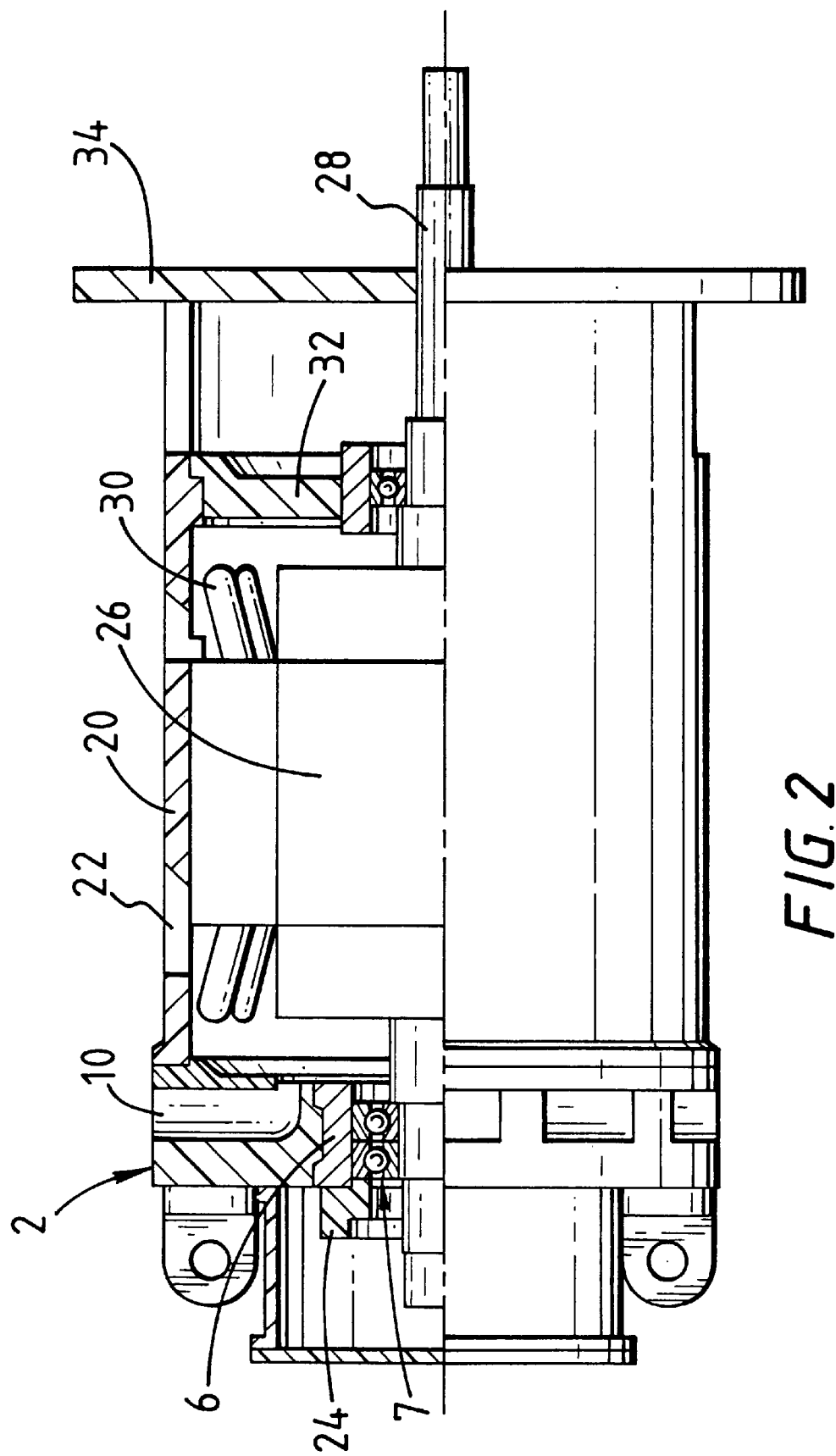
FIG. 2 is a longitudinal sectional view of a composite motor housing and rotor shaft arranged according to the invention.

As shown in the upper portion of FIG. 2, which is a section view of the motor assembly, the front end housing part 2 is attached to a stator frame part 20 of the motor assembly which may be composed of metal and/or composite material. The stator frame part 20 is formed with vents 22 which, in cooperation with vents 10 in the front end housing, permit air to circulate through the motor housing. A metal bearing cap 24 is attached to the metal hub sleeve 6 to retain the rotor shaft thrust bearing 7. A rotor 26 for the motor is supported on a shaft 28 which is received in the metal hub 6. The shaft 28 contains both metal and composite resin material. Stator windings 30 are located within the stator frame part 20 to produce rotation of the rotor when energized. The output end of the motor housing has a pulley end housing 32 mounted on the other end of the stator frame which may also be made of composite material. The pulley end of the stator frame is equipped with a metal or composite mounting flange 34.

As shown in the sectional view of FIG. 3, the front end of the motor housing consists of a relatively large proportion of composite material, i.e. more than 50 percent, thereby making it lighter and easier to fabricate.

As best seen in FIG. 4, the front end housing part 2 of the motor assembly includes eight air inlet passages 10, which provide a cooling flow path for the motor.

Figure 5:
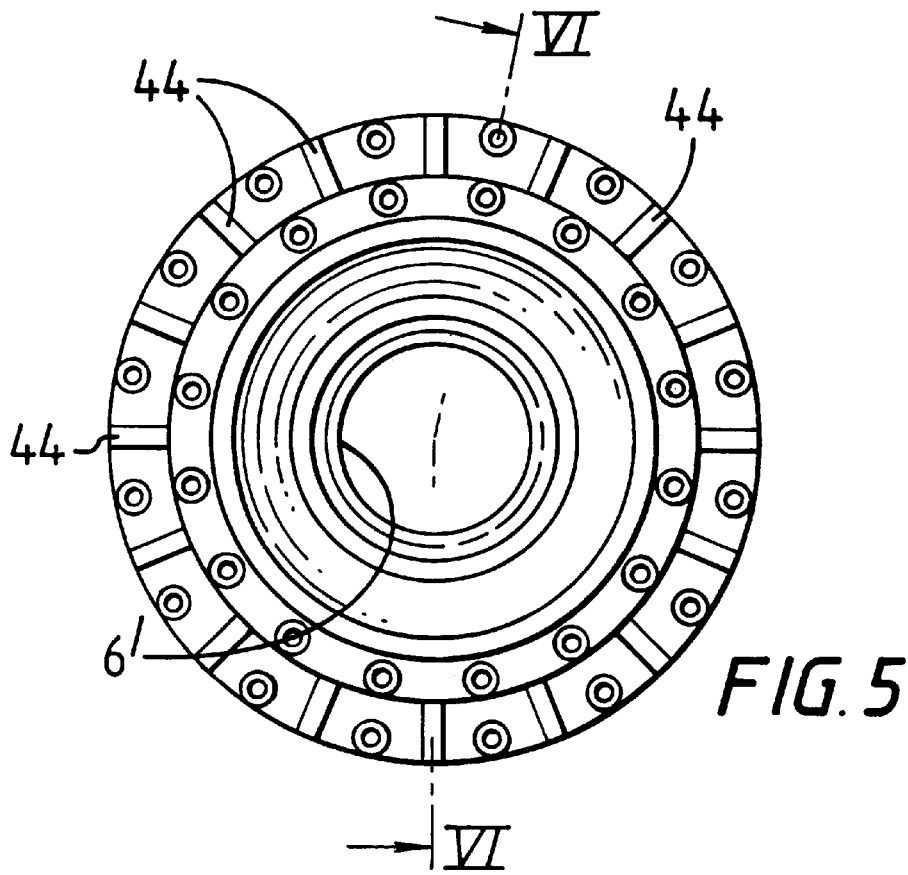
FIG. 5 is an end view of a pulley end housing the motor assembly shown in FIG. 2.
Figure 6:
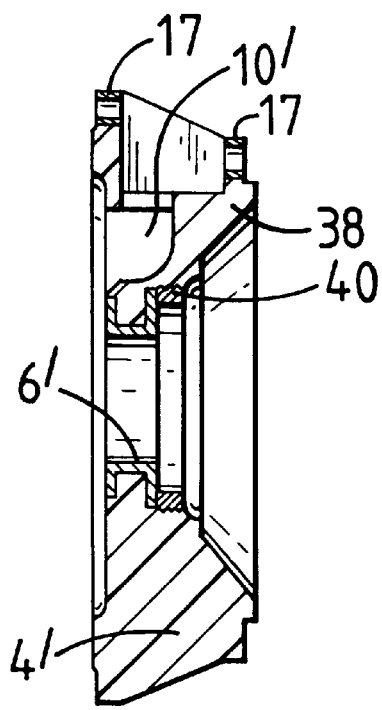
FIG. 6 is a cross-sectional view of the pulley end part shown in FIG. 5, taken along the line VI—VI of FIG. 5 and looking in the direction of the arrows.

A cut-away view taken along line VI—VI of FIG. 5 is shown in FIG. 6. Metal bushings 17 provide a bearing surface for the housing closure bolts. A main bearing hub sleeve 38 receives the metal hub sleeve 6. The hub sleeve 6 is mounted in to the composite material 4 with a threaded insert 40.

Figure 7:
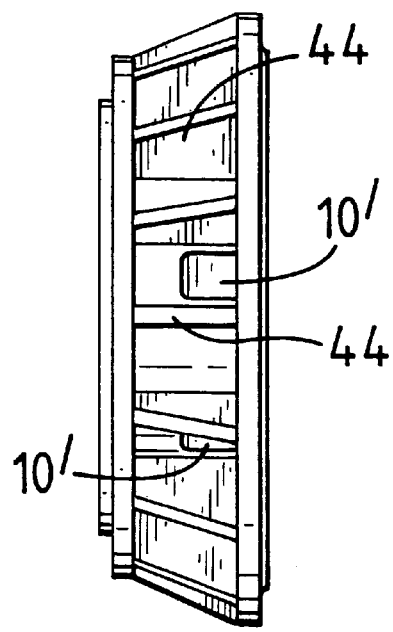

An edge view of the pulley end section of the motor housing is shown in FIG. 7. As can be seen from FIG. 7 the air vents 10 are located between the gussets 44.

A motor housing in accordance with the invention may be prepared by providing a metal cylinder 42, bonding composite plates 48 around the metal cylinder so as to form a metal within composite cylinder and then curing between metal plates 46 under full vacuum at a temperature of 300° F. for 360 minutes. Thereafter, the air passages are machined into the composite material.

The metal parts used in the motor housing can be formed of any suitable metal, preferably steel or corrosion resistant metal alloy. Suitable nonmetallic composite material includes but is not limited to composites made from resin with or without high strength, high modulus fiber such as fiberglass, graphite, carbon, boron, quartz and aramid fibers, i.e. aromatic polyamide fibers characterized by excellent high temperature, flame resistance and electrical properties.

The nonmetallic portions of the motor housing reduce weight and vibration transmission as compared to housings made of metal. The increased damping provided by the nonmetallic portions results in damping of vibrations. This damping minimnizes the detrimental forces imparted by a motor on the driven component as well as forces imparted by the driven component on the motor. The changes in stiffness and inertia of the housing by the incorporation of nonmetallic materials results in increased absorption of vibratory energy.

Moreover, the motor housing according to the invention has improved corrosion resistance since nonmetallic composite material is inert in most environments, while housings made of steel or other metals are subject to corrosion in certain environments.

The use of composite materials in a motor housing facilitates the fabrication of a motor with complex geometries and allows variation of motor damping along the length of the motor to further attenuate vibratory energy. Varying the thickness and fiber laying geometry in the composite housing may be used to control motor housing strength, stiffness and damping characteristics.

Although the invention has been described herein with respect to specific embodiments, many modifications and variations therein will readily occur to those skilled in the art. Accordingly, all such variations and modifications are included with the intended scope of the invention.

We claim:

1. A method for making a housing member for an electric motor comprising:

applying a composite fiber material to the surface of a metal cylinder;

press-forming the composite fiber material into a cylinder; and machining passages through the press-formed composite material.

2. A method according to claim 1 including forming ventilating apertures in the composite fiber material.

3. A method according to claim 1 including mounting metal lifting lugs in the composite fiber material.

4. A method according to claim 1 including providing a metallic rotor bearing sleeve in a wall of the composite fiber material.

5. A method according to claim 1 wherein the composite fiber material comprises fibers selected from the group consisting of fibergass and graphite carbon, boron quartz and aramid fibers.

\* \* \* \* \*

UNITED STATES PATENT AND TRADEMARK OFFICE
CERTIFICATE OF CORRECTION

PATENT NO. : 6,125,528
DATED : October 3, 2000
INVENTOR(S) : Piet Van Dine et al.

It is certified that error appears in the above-identified patent and that said Letters Patent is hereby corrected as shown below:

Title page,
Item [56] References Cited, FOREIGN PATENT DOCUMENTS,
"431826 8/1994 Germany" should read -- 4313826 8/1994 Germany --.
OTHER PUBLICATIONS, "111-112" should read -- 11-12 --.

Column 1,
Line 59, "FIGS 5-6 and FIG. 8" should read -- FIGS 5-6 and ¶FIG. 8 --.

Column 2,
Line 38, "50" should read -- 50 --.

Column 3,
Line 5, "minimnizes" should read -- minimizes --.
Line 7, "stiffiness" should read -- stiffness --.

Column 4,
Line 22, "fibergass" should read -- fiberglass --; and "boron quartz" should read -- boron, quartz --.

Signed and Sealed this

Second Day of April, 2002

*Attest:*

*Attesting Officer*

JAMES E. ROGAN
*Director of the United States Patent and Trademark Office*